US008825047B2

(12) United States Patent
Saini et al.

(10) Patent No.: US 8,825,047 B2
(45) Date of Patent: Sep. 2, 2014

(54) SEARCHING AND REPORTING PUBLIC LAND MOBILE NETWORKS (PLMNS) IN A MOBILE TELECOMMUNICATIONS SYSTEM

(75) Inventors: Sukhdev Saini, Birmingham (GB); Andrew Farnsworth, Bromsgrove (GB)

(73) Assignee: BlackBerry Limited, Waterloo, Ontario (CA)

( * ) Notice: Subject to any disclaimer, the term of this patent is extended or adjusted under 35 U.S.C. 154(b) by 226 days.

(21) Appl. No.: 13/094,358

(22) Filed: Apr. 26, 2011

(65) Prior Publication Data

US 2011/0263252 A1    Oct. 27, 2011

Related U.S. Application Data

(60) Provisional application No. 61/327,976, filed on Apr. 26, 2010.

(51) Int. Cl.
   *H04M 3/00*     (2006.01)
   *H04W 4/00*     (2009.01)
   *H04W 72/00*    (2009.01)

(52) U.S. Cl.
   USPC ........ 455/434; 455/422.1; 455/418; 455/450; 455/452.1

(58) Field of Classification Search
   USPC ........... 455/180.1, 188.1, 224, 266, 418–420, 455/422.1, 434, 447–451, 452.1–452.2, 455/454, 524–515, 560–561, 550.1, 556.2, 455/435.1–435.2, 453, 524–525
   See application file for complete search history.

(56) References Cited

U.S. PATENT DOCUMENTS

| 7,773,990 | B2 * | 8/2010 | Ekstedt et al. | 455/435.3 |
| 7,835,712 | B1 * | 11/2010 | Shi et al. | 455/168.1 |
| 7,953,119 | B2 * | 5/2011 | Cho et al. | 370/503 |
| 2006/0105788 | A1 * | 5/2006 | Duan et al. | 455/456.5 |
| 2007/0211669 | A1 * | 9/2007 | Umatt et al. | 370/335 |
| 2009/0059835 | A1 * | 3/2009 | Motegi et al. | 370/312 |
| 2009/0215446 | A1 * | 8/2009 | Hapsari et al. | 455/432.1 |
| 2010/0081433 | A1 * | 4/2010 | Lee | 455/434 |
| 2010/0136969 | A1 * | 6/2010 | Nader et al. | 455/434 |
| 2010/0322169 | A1 * | 12/2010 | Narasimha | 370/329 |

FOREIGN PATENT DOCUMENTS

CN         101583137 A  * 11/2009 ............ H04W 24/00

OTHER PUBLICATIONS

3GPP TS 25.331 v6.24.0; 3rd Generation Partnership Project; Technical Specification Group Radio Access Network; Radio Resource Control (RRC); Protocol Specification (Release 6); Dec. 2009; 1254 pgs.

(Continued)

*Primary Examiner* — Meless Zewdu
(74) *Attorney, Agent, or Firm* — Conley Rose, P.C.; J. Robert Brown, Jr.

(57) ABSTRACT

A method and apparatus for searching for and reporting Public Land Mobile Networks "PLMNs" in a mobile telecommunications system, the method comprising, at a mobile device: initiating a scan to find Public Land Mobile Networks; when a cell of a PLMN is detected on a frequency, then reading system information to determine one or more PLMN identities of the detected cell; determining whether the detected cell operates in a frequency band supported by the mobile device; when it is determined that the detected cell does not operate in a band supported by the device, omitting adding the associated one or more PLMN identities from a first of PLMNs, and otherwise adding the one or more PLMN identities to the list of PLMNs; and reporting the list of PLMNs.

25 Claims, 5 Drawing Sheets

(56) References Cited

OTHER PUBLICATIONS

3GPP TS 25.304 v9.0.0; 3rd Generation Partnership Project; Technical Specification Group Radio Access Network; User Equipment (UE) Procedures in Idle Mode and Procedures for Cell Reselection in Connected Mode (Release 9); Dec. 2009; 49 pgs.

3GPP TS 36.304 v9.1.0; 3rd Generation Partnership Project; Technical Specification Group Radio Access Network; Evolved Universal Terrestrial Radio Access (E-UTRA); User Equipment (UE) Procedures in Idle Mode (Release 9); Dec. 2009; 31 pgs.

3GPP TS 36.331 v8.7.0; 3rd Generation Partnership Project; Technical Specification Group Radio Access Network; Evolved Universal Terrestrial Radio Access (E-UTRA) Radio Resource Control (RRC); Protocol Specification (Release 8); Sep. 2009; 208 pgs.

Research in Motion Limited; EPO Extended Search Report; EP Application No. 11163399.6 dated Oct. 4, 2011; 7 pgs.

3GPP TS 23.122 v9.2.0; 3rd Generation Partnership Project; Technical Specification Group Core Network and Terminals; Non-Access-Stratum (NAS) Functions Related to Mobile Station (MS) in Idle Mode; Release 9; Mar. 2010; 42 pgs.

Research in Motion UK Limited; 3GPP TSG-RAN WG2 v9.1.0 Meeting #70; R2-103004; Title: Reporting of PLMNs for Overlapping Bands; Montreal, Canada; May 10-14, 2010; 4 pgs.

Research in Motion UK Limited; 3GPP TSG-RAN WG2 v9.1.0 Meeting #70; R2-103003; Title: Reporting of PLMNs for Overlapping Bands; Montreal, Canada; May 10-14, 2010; 4 pgs.

ETSI TS 125 304 v7.5.0; Technical Specification Universal Mobile Telecommunications System (UMTS); User Equipment (UE) Procedures in Idle Mode and Procedures for Cell Reselection in Connected Mode (3GPP TS 25.304 version 7.5.0 Release 7); Apr. 2008; 44 pgs.

* cited by examiner

SEARCHING AND REPORTING PUBLIC LAND MOBILE NETWORKS (PLMNS) IN A MOBILE TELECOMMUNICATIONS SYSTEM

CROSS-REFERENCE TO RELATED APPLICATIONS

The present application claims priority to U.S. Provisional Patent Application No. 61/327,976 filed Apr. 26, 2010, by Sukhdev Saini, et al, entitled "Apparatus and Method for Searching for an Reporting Public Land Mobile Networks "PLMNs" in a Mobile Telecommunications System" (38400-US-PRV—4214-26900), which is incorporated by reference herein as if reproduced in its entirety.

BACKGROUND

This application relates to mobile telecommunications systems in general, and in particular relates to a method and apparatus for searching for and reporting Public Land Mobile Networks "PLMNs" in a mobile telecommunications system In a typical cellular radio system, mobile user equipment (UE) communicates via one or more radio access radio networks (RANs) to one or more core networks. User equipment (UE) or mobile devices comprises various types of equipment such as mobile telephones (also known as cellular or cell phones), lap tops with wireless communication capability, personal digital assistants (PDAs) etc. These may be portable, hand held, pocket sized, installed in a vehicle etc and communicate voice and/or data signals with the radio access network.

In the following, reference will be made to UMTS, LTE and to particular standards. However it should be understood that the invention is not intended to be limited to any particular mobile telecommunications system.

A radio access network covers a geographical area typically divided into a plurality of cell areas. Each cell area is served by at least one base station, which in UMTS may be referred to as a Node B. Each cell is typically identified by a unique identifier which is broadcast in the cell. The base stations communicate on radio frequencies over an air interface with the UEs within range of the base station. Several base stations may be connected to a radio network controller (RNC) which controls various activities of the base stations. The radio network controllers are typically connected to a core network.

In wireless telecommunications systems, mobile devices, such as handheld telephone devices, communicate wirelessly with networks known as PLMNs (Public Land Mobile Networks). PLMNs may use one or more radio access technologies. Examples of such radio access technologies are GSM, UMTS, also referred to as UTRA, LTE, also referred to as E-UTRA, CDMA2000 etc.

Typically the mobile devices (which are also known as UEs or User Equipment) communicate with components of the PLMNs, periodically reporting the availability of base stations or network nodes (e.g. Node Bs) for various PLMNs to enable handover between base stations or network nodes as a UE roams geographically or as network traffic on PLMNs varies.

The mobile devices may perform a scan to report the availability of PLMNs. Such a scan may be initiated in various situations, for example at power on, at return from loss of coverage, user initiated and periodically. This information about the available PLMNs may be used internally by the mobile device, for example to automatically select a different PLMN, and may also be reported via a user interface to allow the user to manually select a different PLMN.

In many Radio Access Technologies, a PLMN is uniquely identified by a PLMN identity which may comprise a mobile country code (MCC) and a mobile Network Code (MNC). MCC comprises three digits, of which the first one indicates a world zone (e.g. 3xx indicates North America) and the second and third digits represent individual nations in these zones (for instance the MCC of Canada is 302). The MNC identifies a PLMN in a country. It comprises two or three digits and is allocated by national organisations for mobile telecommunications standards. The PLMN identity uniquely identifies a PLMN.

3GPP Technical Specification number 25.304 v.9.0.0 section 5 (UMTS) (herein incorporated by reference in its entirety) specifies that the UE Access Stratum shall search for and report 'available PLMNs' to the UE Non-Access Stratum (NAS). In section 3.1, the term "available PLMN" is defined to mean "A PLMN for which the UE has found at least one cell and read its PLMN identity". The standard does not specify any requirements beyond reading the PLMN identity. 3GPP Technical Specification number 36.304 v. 9.1.0 (LTE) (herein incorporated by reference in its entirety) is similar.

There are thus proposed strategies for searching for and reporting Public Land Mobile Networks "PLMNs" in a mobile telecommunications system. A number of such strategies are detailed below.

Other aspects and features of the proposed strategy will become apparent to those ordinarily skilled in the art upon review of the following description of specific embodiments of an apparatus and method for searching for and reporting Public Land Mobile Networks "PLMNs" in a mobile telecommunications system.

BRIEF DESCRIPTION OF THE DRAWINGS

Embodiments will now be described, by way of example only, with reference to the attached drawings, in which.

The same reference numerals are used in different figures to denote similar elements.

DETAILED DESCRIPTION OF THE DRAWINGS

A method and apparatus for searching for and reporting Public Land Mobile Networks "PLMNs" in a mobile telecommunications system is described. In the following description, for the purposes of explanation, numerous specific details are set forth in order to provide a thorough understanding of the present invention. It will be apparent, however, to one skilled in the art that the technique may be practised without these specific details. In other instances, well-known structures and devices are shown in block diagram form in order to avoid unnecessarily obscuring the present invention.

The needs identified in the foregoing Background, and other needs and objects that will become apparent from the following description, are achieved by, in one aspect, a method for searching for and reporting Public Land Mobile Networks "PLMNs" in a mobile telecommunications system. There is provided a method comprising, at a mobile device: scanning for cells; when a cell is detected on a frequency, then determining one or more PLMN identities of the detected cell: determining whether the detected cell operates in a frequency band supported by the mobile device or a frequency band that is unsupported by the mobile device; when it is determined that the detected cell operates in a frequency band unsupported by the device, the associated one or more PLMN identities are not reported; when it is determined that the detected cell operates in a frequency band supported by the device, reporting the one or more PLMN. When a UE is unable to determine whether the detected cell operates in a frequency band supported by the mobile device, the one or more PLMN identities of the detected cell may be reported. System information may be used to determine whether the detected cell operates in a frequency band supported by the mobile device. In other aspects, the invention encompasses apparatus and a computer-readable medium configured to carry out the foregoing actions, as well as a data carrier carrying thereon or therein data indicative of instructions executable by processing means to cause those means to carry out the foregoing actions. Examples are CD-ROMs, memory sticks, dongles, transmitted signals, downloaded files etc. In particular, the method may be implemented in a mobile telecommunications device, with or without voice capabilities, or other electronic devices such as handheld or portable devices.

Figure 1:
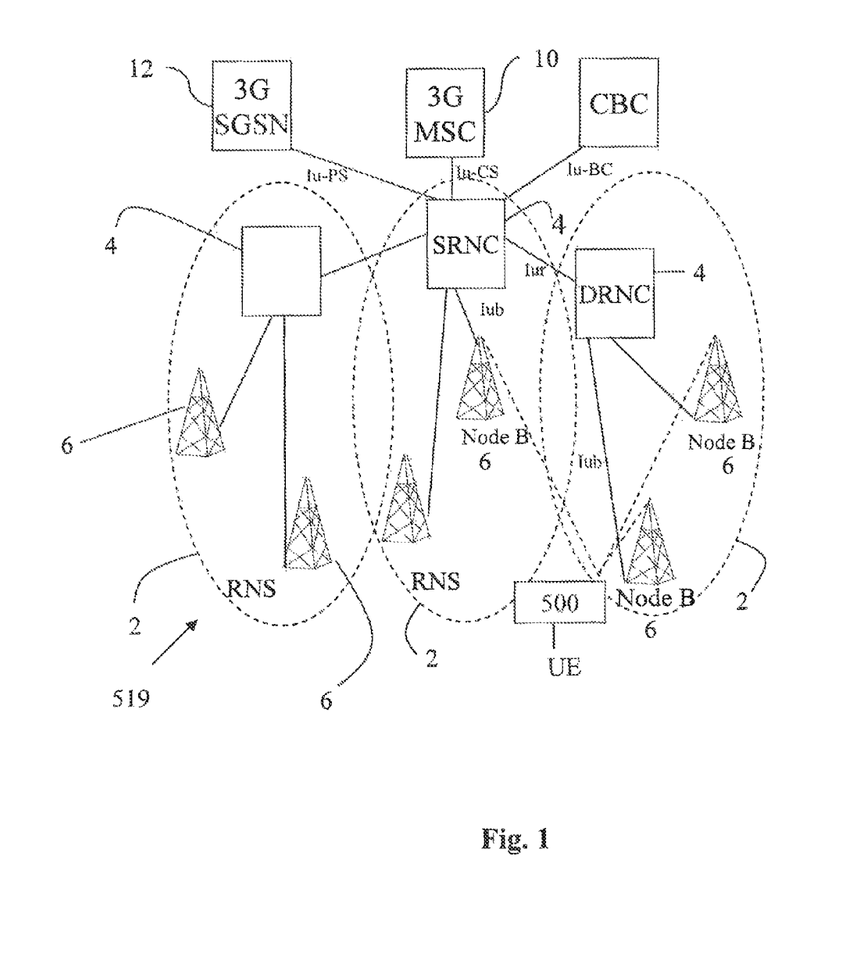
FIG. 1 shows an overview of a network and a user equipment device.

FIG. 1 shows an overview of a network and a UE device. Clearly in practice there may be many UE devices operating with the network but, for the sake of simplicity, FIG. 1 only shows a single UE device 500. For the purposes of illustration, FIG. 1 also shows a network 519 having a few components. It will be clear to a person skilled in the art that in practice a network will include far more components than those shown.

FIG. 1 shows an overview of the radio access network 519 (UTRAN) used in a UMTS system. The network 519 as shown in FIG. 1 comprises three Radio Network Subsystems (RNS) 2. Each RNS has a Radio Network Controller (RNC) 4. Each RNS 2 has one or more Node B 6 which are similar in function to a Base Transmitter Station of a GSM radio access network or an EUTRAN Node B (eNB) of an EUTRAN radio access network, User Equipment UE 500 may be mobile within the radio access network. Radio connections (indicated by the straight dotted lines in FIG. 1) are established between the UE and one or more of the Node Bs in the UTRAN.

The radio network controller controls the use and reliability of the radio resources within the RNS 2. Each RNC may also be connected to a 3G mobile switching centre 10 (3G MSC) and a 3G serving GPRS support node 12 (3G SGSN).

An RNC 4 controls one or more Node B's. An RNC plus its Node B's together make up an RNS 2. A Node B controls one or more cells. Each cell is uniquely identified by a frequency and a primary scrambling code (primary CPICH in FDD, primary CCPCH in TDD).

Generally in UMTS a cell refers to a radio network object that can be uniquely identified by a UE from a cell identifier that is broadcast over geographical areas from a UTRAN access point. A UTRAN access point is a conceptual point within the UTRAN performing radio transmission and reception. A UTRAN access point is associated with one specific cell i.e., there exists one UTRAN access point for each cell. It is the UTRAN-side end point of a radio link. A single physical Node B 6 may operate as more than one cell since it may operate at multiple frequencies and/or with multiple scrambling codes.

FIG. 1 only shows one RAN however it will be appreciated that coverage may be provided by cells that belong to one or more RANs, that in turn may belong to one or more PLMNs.

Figure 2:
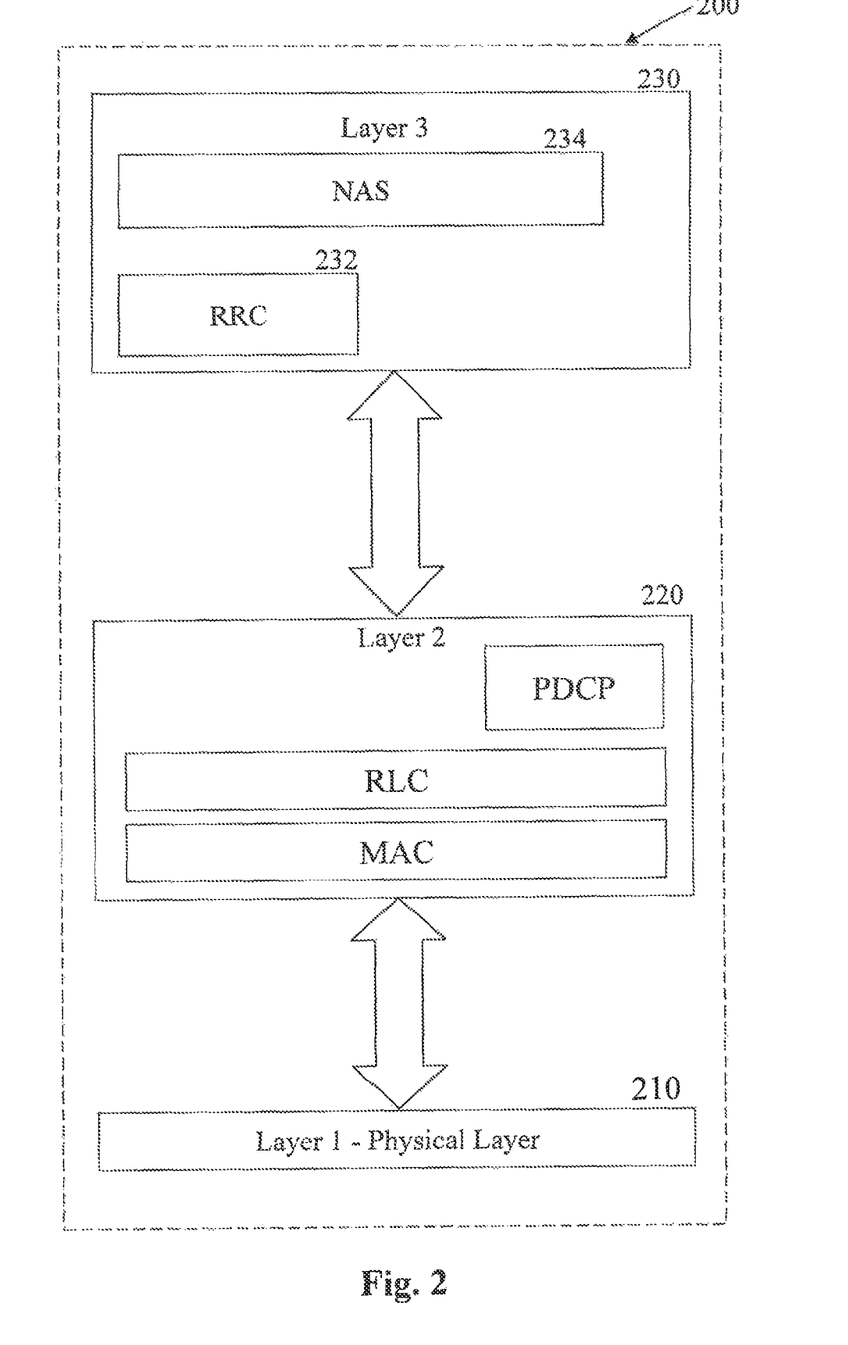
FIG. 2 is a block diagram illustrating an embodiment of a protocol stack apparatus provided with a RRC block, in accordance with the present application.

FIG. 2 is a block diagram illustrating an embodiment of a protocol stack 200 provided in a UE. The illustrated protocol stack 200 could be, for example, a UMTS protocol stack or an LTE protocol stack. A Radio Resource Controller (RRC) block 232 is a sub layer of Layer 3 230 of the protocol stack 200. The RRC layer 232 together with Layer 2 220 and Layer 1 210 may be referred to as the Access Stratum (AS). The RRC 232 exists in the control plane only and provides an information transfer service to the non-access stratum NAS 234. The RRC 232 is responsible for controlling the configuration of radio interface Layer 1 210 and Layer 2 220. When the network wishes to change the UE configuration it will issue a message to the UE containing a command to invoke a specific RRC procedure. The RRC layer 232 of the UE decodes this message and initiates the appropriate RRC procedure. Generally when the procedure has been completed (either successfully or not) then the UE RRC layer sends a response message to the network (via the lower layers) informing the network RRC layer of the outcome. It should be noted that there are a few scenarios where the RRC will not issue a response message to the network and, in those cases the RRC need not and does not reply.

The strategies for searching for and reporting Public Land Mobile Networks "PLMNs" in a mobile telecommunications system as discussed above with reference to the drawings may be implemented by the RRC block 232.

The proposal described herein is that PLMNs which are read by the UE from cells using bands with overlapping frequency range but which are bands that are not supported by the mobile device should not be considered as "available PLMNs". Thus, in those cases in which the UE knows with certainty that the detected cell will not be able to provide service (such as when the detected cell belongs to an overlapping frequency band that the UE does not support) then these PLMNs are not added to a list of available PLMNS and not reported. Thus any PLMNs which are read on the device from cells that are using overlapping but unsupported frequency bands will not be considered as "available PLMNs". This means that these PLMNs will not be indicated as available to the NAS and will not be falsely presented to a user, so meaning that a user does not have the option of manually trying to select such PLMNs although access to these PLMNs is not supported by device. When a UE is unable to determine whether the detected cell operates in a frequency band supported by the mobile device, the PLMN identity of the detected cell may be added to the list of PLMNs. The proposal may use system information to determine whether the detected cell operates in a frequency band supported by the mobile device.

Example 1

Device is a device that operates in Band1, 2 & 5, Band1 and Band4 overlap in Downlink (DL) frequency range (2110-2155 MHz).

The device can detect cells on an overlapping but unsupported band (Band4) and can also read system information that is broadcast by the cells. In UMTS, the system information is structured into a number of blocks such as the Master Information Block (MIB), Scheduling Blocks (SB1 and SB2)

and System Information Blocks (e.g. SIB1, SIB2, SIB3, SIB4, SIB5, SIB5bis, etc). The MIB contains one or more PLMN identities of the cell. Thus it can be seen that the device can read the PLMN identity(s) from a cell that is using an overlapping but unsupported band (Band4). The MIB, and possibly SB1 and SB2, contain scheduling information of SIBs that are transmitted from the cell. By reading this scheduling information from the MIB, and possibly SB1/SB2, the device can determine whether SIB5 or SIB5bis is transmitted from the cell. If the MIB schedules SIB5 or SIB5bis, then a UE supporting just band 1 can determine whether the cell is supported or not supported respectively. If MIB schedules SB1 (Scheduling Block 1) and that schedules SIB5 or SIB5bis, then if the UE reads SB1 it can make the determination. Alternatively the UE may just read the MIB, and reading the MIB may or may not allow the UE to determine whether the cell is supported. There may be a trade off in the level of system information read to determine whether the cell is supported. For instance, reading system information down to the level of SB1 may allow the determination to be made, but reading system information to a higher level e.g. the MIB may speed up the scan considerably by saving the time taken to read SB.

If SIB5Bis IE (Information Element) is present in MIB or SB1/2, indicating that SIB5bis is transmitted from the cell, and the cell is in an overlapping region of Band1/Band4 and Band4 is not supported by the device then the device can know with certainty that this cell can not be used to provide access to the PLMN. If all the cells from which a PLMN identity has been read are cells that use an overlapping but unsupported band (Band4) the PLMN is not reported to NAS.

Consider a UE that only supports bands that use SIB5. If this UE reads MIB and possibly SB1/2 from any cell and the UE sees that SIB5 is not scheduled then the UE can determine that the cell is from a band that is unsupported by the UE. Conversely, if this UE reads MIB and possibly SB1/2 from any cell and the UE sees that SIB5bis is scheduled then the UE can determine that the cell is from a band that is unsupported by the UE. As another example, consider a UE that only supports bands that use SIB5bis. If this UE reads MIB and possibly SB1/2 from any cell and the UE sees that SIB5bis is not scheduled then the UE can determine that the cell is from a band that the UE does not support. Conversely, if this UE reads MIB and possibly SB1/2 from any cell and the UE sees that SIB5 is scheduled then the UE can determine that the cell is from a band that the UE does not support. As another example, consider a UE that supports one or more bands that use SIB5 and one or more bands that use SIB5bis. If this UE reads MIB and possibly SB1/2 from a cell operating on a frequency that is not within one of its supported bands that use SIB5bis, and the UE sees that SIB5bis is scheduled then the UE can determine that the cell is from a band that the UE does not support. Also if this UE reads MIB and possibly SB1/2 from a cell operating on a frequency that is not within one of its supported bands that use SIB5, and the UE sees that SIB5 is scheduled then the UE can determine that the cell is from a band that the UE does not support. Also, a UE can determine from reading the frequency band indicator present on SIB5 or SIB5bis of a cell that the cell is from a band that the UE does not support. Furthermore, if a UE finds one cell from an unsupported band then the UE may exclude all frequencies of the unsupported band that overlap with frequencies of a supported band from being considered further in the scan, or the UE may exclude all frequencies of any supported band that overlaps with the unsupported band. When a UE is unable to determine whether the detected cell operates in a frequency band supported by the mobile device, then the default setting may be for the PLMN identity of the detected cell to be added to the list of PLMNs.

As background, SIB5bis was introduced by 3GPP as a way to allow new frequency bands to be created that overlap existing frequency bands. For example, when Band 4 was introduced it overlapped Band 1. To prevent older Band 1 UEs from camping on Band 4 cells (and then transmitting their PRACH messages on the wrong uplink frequency due to a different Tx/Rx frequency separation). Band 4 networks transmit SIB5bis instead of SIB5. Band 4 UEs expect SIB5bis and can camp to the cell, but older Band 1 mobiles simply see that SIB5 is missing and thus do not camp to the Band 4 cell. SIB5bis is identical to SIB5 except for the SIB type.

Thus, in this example, the UE supports Band 1 but not Band 4. In a region where Band 4 is deployed, the UE will be able to read the PLMN identity from the MIB of a Band 4 cell. However, if this PLMN were to be selected (either by the user or automatically) then the UE will not be able to access the cell. The UE may determine from reading the MIB and possibly SB1/SB2 that the cell is from a band that the UE does not support. For example, a UE may use the presence or absence of SIB5 or SIB5Bis to determine whether the PLMN is in an unsupported band. For instance, it may expect SIB5 but see that SIB5bis instead of SIB5 is scheduled in the MIB. In such a case, it is desirable that the UE-AS does not report this PLMN to the NAS so that, in the case of manual PLMN selection, the user is not presented with a PLMN that can never be used, and in the case of automatic PLMN selection the selection of a usable PLMN is not delayed due to the NAS initially selecting a PLMN that can never be used. Similarly, it may expect SIB5 and determine that this is not scheduled in the MIB or SB1/2 and so determine that the PLMN is in an unsupported band.

Thus the UE does not consider the PLMN identity as available and therefore does not report to the NAS PLMN identities that have been read from cells that belong to bands that the UE does not support. The UE is arranged to not report a PLMN to NAS if all the cells from which this PLMN identity has been read are known to belong to one or more UTRA bands that the UE does not support (e.g. in the case in which an unsupported UTRA band overlaps with a supported UTRA band). In addition the UE may also not report a PLMN to NAS if all the cells from which this PLMN has been read are known would not be suitable due to being barred, or considered as barred (for instance according to any of the criteria specified in subclause 5.3.1.1 of TS 25.304 or TS 25.331), or belonging to a LA within the "forbidden LAs for roaming", or not fulfilling the cell selection criteria.

There are cases where the UE cannot know which band the cell belongs to (e.g. if the device cannot tell from the MIB whether the band of the cell is an unsupported band, for instance if SIB5 or SIB5bis is scheduled from a Scheduling Block instead of the MIB, or if the overlapping bands both use SIB5). Forcing UEs to always read enough system information to determine the band of a cell may have a detrimental effect on PLMN search times. Therefore the UE may be enabled to report a PLMN identity to the NAS if the relevant additional system information (e.g. obtained from MIB, SB or SIB) is scheduled to be transmitted later than a threshold time period but to wait and read the additional system information if this is scheduled to be transmitted within the threshold time period. Thus when additional system information is scheduled to be transmitted later than within the threshold time period, the one or more PLMN identities are added to the list of PLMNs without a delay and when additional system information is scheduled to be transmitted within but no later than the threshold time period, the UE waits to read the additional system information and uses the additional system information to determine whether the detected cell operates in a frequency band supported by the mobile device. If the additional system information that is scheduled to be transmitted within the threshold time period is not received within the threshold time period, then the UE may add the one or more PLMN identities to the list of PLMNs at the expiry of the threshold time period.

For instance, in UMTS, MIBs are scheduled every 80 ms, SB every 160 or 320 ms and the SIBs may be scheduled with even longer periodicity. If upon reading the MIB of a cell the UE determines that the neither SIB5 nor SIB5bis is scheduled from the MIB then the UE can not determine for certain whether the cell belongs to an unsupported band and so UE may need to receive a SB to make the determination. If the scheduling in the MIB indicates that the next occurrence of the SB will be in 160 ms waiting for the SB information may introduce too great a delay into the scan process. However, if the scheduling in the MIB indicates that the next occurrence of the SB will be in 20 ms then waiting for the SB may be worthwhile.

An example process that meets the requirements as set out in 3GPP Technical Specification number 25.304 v.9.0.0 section 5 will be described in relation to FIG. 3 of the drawings. For LTE, a very similar process to that described in FIG. 3 can be used to meet the requirements as set out in 3GPP Technical Specification number 36.304 section 5. In an example implementation, for UMTS, the non-access stratum layer (NAS) requests the access stratum (AS) to perform a PLMN scan. This initiates a PLMN scan, operation 300 and a list of PLMNs is initialised (i.e. a list of available PLMNs is empty).

The UE then determines if there are one or more frequencies on which to perform a cell detection process, operation 304. As this is the first time that the UE has performed operation 304 then there will be more frequencies to perform the detected cell process on (operation 304 answered in the affirmative) if at least one downlink frequency has been detected.

The UE then chooses a downlink (DL) frequency from its supported bands and performs a cell detection process on this frequency, operation 306. The UE may choose the DL frequency in different ways. For example, the UE may choose the next DL frequency on which cell detection had not been performed before, or the UE may use choose a frequency on which the UE has detected energy, or the UE may choose a frequency on which it has commonly detected cells before. The UE then determines if a cell is detected on that frequency, operation 308. If no cell is detected on the given frequency (operation 308 answered in the negative) the UE then determines if there are more frequencies to perform a detected cell process on, operation 304. If so, the UE chooses a downlink frequency and performs the cell detection operation on the chosen frequency, operation 306. If in operation 308, a cell is detected on the frequency then the UE reads system information (such as reading the MIB in the case of a UMTS cell or reading SIB1 in the case of an LTE cell) to obtain one or more PLMN identities of the cell, operation 312. The system information of the cell may contain more than one PLMN identity in the case that the cell is shared by more than one network operator with different PLMN identities, a situation sometimes referred to as Radio Access Network (RAN) sharing or a Multi Operator Core Network (MOCN). The device then adds the associated PLMN identity or identities to a list of PLMNs, operation 314. In operation 314, if the list of PLMNs already contains the PLMN identity to be added then it is not necessary to create a duplicate entry in the list for this PLMN.

Once there are no more frequencies on which to perform the cell detection operation (operation 304 answered in the negative), the UE determines if there are any PLMNs to report to the NAS, operation 316. If there are no PLMNs to be reported, then the UE reports an empty PLMN list to the NAS, operation 320. If there is at least one PLMN to be reported, then the UE reports the list of PLMNs to the NAS, operation 318. The scan operation then ends. Although in this figure the list of PLMNs is reported to the NAS once all cells found in the scan have been considered, an alternative implementation would be to report the PLMNs to the NAS as they are found for each cell.

Figure 3:
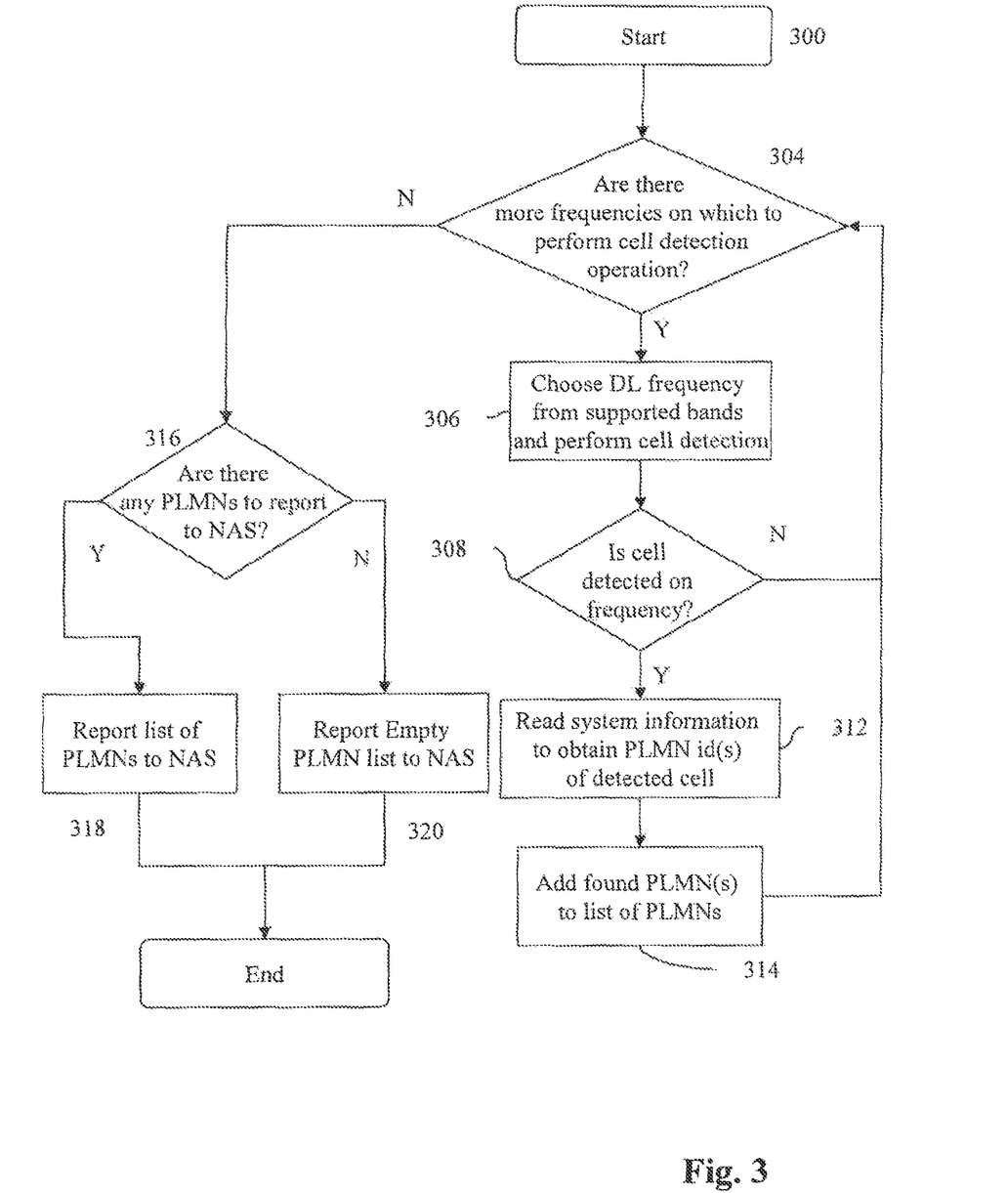
FIG. 3 is a flow diagram illustrating an example process that meets the requirements as set out in 3GPP Technical Specification number 25.304 v.9.0.0 section 5.
Figure 4:
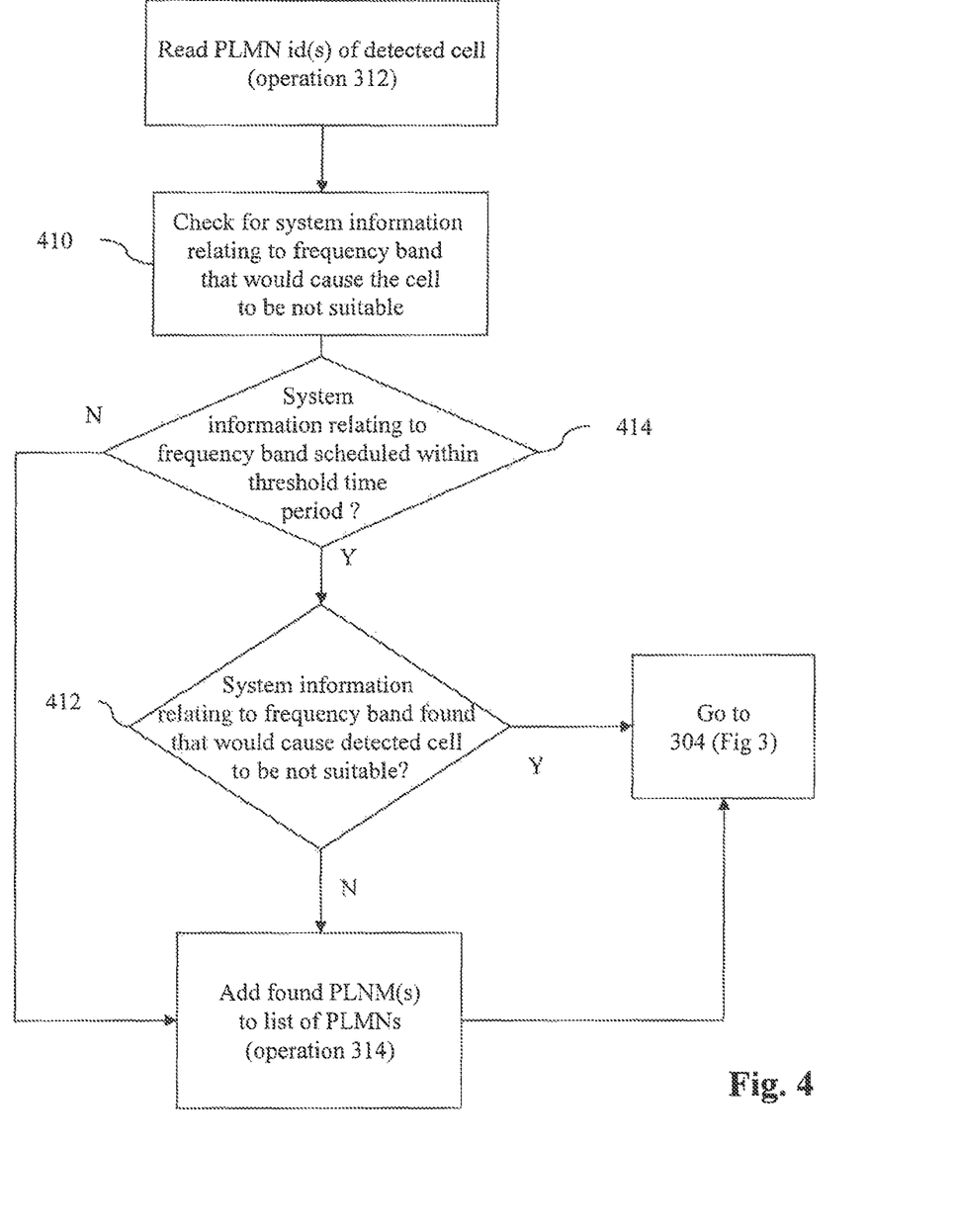
FIG. 4 is a flow diagram illustrating the proposed technique.

The enhanced process is illustrated in FIG. 4. FIG. 4 illustrates additional operations that occur between operation 312 and operation 314 as shown in FIG. 3. All other steps of FIG. 3 may be unchanged. As shown in FIG. 4, one or more extra checks are carried out at steps 410 and 412 to prevent the UE from reporting a PLMN that the UE is able to determine would be unsuitable. As shown in FIG. 4, once the UE has read the system information on the detected cell to determine the PLMN identity(s) of the cell (step 312), the UE then checks for system information indicating the frequency band on which the cell is operating, (operation 410).

The UE then determines whether it has found any system information relating to frequency band that would cause the detected cell to be unsuitable, operation 412. For instance, one such condition is that the cell belongs to an unsupported frequency band. Another such condition is that neither SIB5 nor SIB5bis is scheduled in system information broadcast in the cell.

In operation 412 when it is determined that there is system information relating to frequency band that would cause the detected cell to be unsuitable then the UE omits adding the PLMN identity(s) to the list of PLMN identities and reverts to step 304 of FIG. 3. However if the UE has not found any system information relating to frequency band that would cause the detected cell to be unsuitable, operation 412, then the UE continues to operation 314 of FIG. 3 and adds the found PLMN identity or identities of the detected cell to the list of available PLMNs. Thus, when a UE determines that the detected cell operates in a frequency band supported by the mobile device, the PLMN identity of the detected cell is added to the list of PLMNs. When a UE is unable to determine whether the detected cell operates in a frequency band supported by the mobile device, the PLMN identity of the detected cell may be added to the list of PLMNs.

As a further enhancement, the UE may be arranged to limit the scan for system information relating to the frequency band. For instance the UE may be enabled to monitor a threshold time period (operation 414). When the relevant additional system information (e.g. obtained from MIB, SB or SIB) is scheduled to be transmitted later than a threshold time period (operation 414 answered in the negative), the UE is arranged to add the PLMN identity or identities to the list of PLMNs (and so report the PLMN identity(s) to the NAS). When the relevant additional system information (e.g. obtained from MIB, SB or SIB) is scheduled to be transmitted within the threshold time period (operation 414 answered in the affirmative), the UE waits to read the additional system information. Thus when additional system information is scheduled to be received later than within the threshold time period, the one or more PLMN identities are included in the list of PLMNs without a delay and when additional system information is scheduled to be received within but no later than the threshold time period, the UE waits to read the additional system information and uses the additional system information to determine whether the detected cell operates in a frequency band supported by the mobile device.

There are many other criteria that can cause a cell to be not suitable. For example, in UMTS there are a number of criteria that are specified in 3GPP TS 25.304 such as whether the cell is indicated in SIB3 as being barred, whether the location area (LA) of the cell is within the list of 'forbidden LAs for roaming', and whether radio measurements of cell are above specified thresholds. In addition 3GPP TS 25.331 specifies a number of conditions under which the UE is required to consider a cell as barred and as a consequence of considering a cell as barred the cell is not suitable. As a further example, in LTE one such condition is that the cell belongs to an unsupported frequency band. Another such condition is that SIB2 is not scheduled in system information broadcast in the cell. There are also a number of other criteria that mean that a cell would not be suitable, for instance as specified in 3GPP TS 36.304 such as whether the cell is indicated in SIB1 as being barred, whether the tracking area (TA) of the cell is within the list of forbidden TAs for roaming', and whether radio measurements of cell are above specified thresholds. In addition 3GPP TS 36.331 specifies a number of conditions under which the UE is required to consider a cell as barred and as a consequence of considering a cell as barred the cell is not suitable.

As can be seen from the examples, there are many criteria that could cause a cell to be not suitable. To select a cell and attempt access to a cell all the conditions required by the relevant standard have to be checked. During the PLMN scan procedure as operation 410, one or more or possibly all of the criteria that could cause a cell to be not suitable may be checked. As an example, in operation 410 a UE may be arranged to check only whether the cell belongs to an unsupported band. As a more specific example, in operation 410 a UMTS UE that supports Band 1 but not Band 4 may be arranged to check whether the cell belongs to an unsupported band by checking if SIB5bis is scheduled from the MIB.

There may be situations in which the UE can not determine for certain the band of UMTS cell from the information in the MIB (and possibly the Scheduling Block). In such a case the operation 412 is answered in the negative. One example of this is the case of overlapping bands 5 and 6 which both use SIB5 but have a frequency band indicator within SIB5 to distinguish between the bands. Hence the UE would have to read SIB5 in order to know whether the cell belongs to a supported band. However it may not be desirable for the UE to spend time reading this system information during the scan.

The device may determine whether the system information is in a supported band based on other additional system information received. For instance, in UMTS the MIB may indicate when the relevant system information is to be scheduled. Alternatively the MIB may indicate the scheduling block (SB) in which the relevant additional system information is scheduled. In either case, the device may wait until the relevant additional system information is received and then read the relevant system information (e.g. SIB5, SIB5Bis etc) to determine whether or not the detected cell is in a supported band.

An inexhaustible list of examples of criteria that would cause the cell to be not suitable that could be checked are, in the UMTS scenario:

If the MIB indicates that the cell is from a band that the UE does not support, for example the UE may read that SIB5bis instead of SIB5 is scheduled in the MIB.

If SIB7 is not scheduled in the cell, then the cell should be treated as if it were barred. 3GPP TS 25.331 v8.8.0 section 8.1.1.5. (herein incorporated by reference in its entirety) states as follows:
1> If System Information Block type 7 is not scheduled on BCH, the UE shall:
2> consider the cell to be barred according to TS 25.304.

In SIB3 a cell can be marked as barred, or reserved for operator use. A SIB3 could be obtained by waiting for it after the MIB, receiving it while waiting for the MIB, or having cached it when it was read from this cell earlier, and validated it by comparing its value tag against the value tag in the just read MIB. If the cell is barred or being treated as bared, the UE cannot camp on it, and it would not be suitable even if its PLMN were selected.

If the cell is so weak that the S criteria are not satisfied (by referring to a SIB3 or SIB4 obtained as described above) then the cell would not be suitable.

If the Location Area (LA) in which the cell resides is in a forbidden LA list, then the cell would not be suitable.

Turning now to another example, a PLMN that is using the LTE radio access technology will be considered. In LTE (as described in 3GPP TS 36.304), when the UE-AS performs a PLMN scan it is required to report "available PLMNs" to the UE-NAS. Available PLMNs are defined as PLMNs for which it has found at least one cell and read its PLMN identity. In LTE, Technical specification 36.331 specifies that this information is transmitted in SIB1. However, there are cases in which the UE knows with certainty that the cell will not be able to provide service, such as when the cell belongs to an overlapping frequency band that the UE does not support.

An example case is a UE that supports Band 1 but not Band 4. In a region where Band 4 is deployed, the UE will be able to read the PLMN identity (plmn-IdentityList) from the SIB1 of a Band 4 cell, and therefore would report this available PLMN to NAS. However, if this PLMN is selected (either by the user or automatically) then the UE will not be able to access the cell.

However, as the IE freqBandIndicator is also contained in SIB1 the UE can determine for certain at the time of reading the PLMN identity whether this cell will be usable by the UE. In a case where the cell will not be useable by the UE, it is desirable that the UE-AS does not report this PLMN to the NAS so that, in the case of manual PLMN selection, the user is not presented with a PLMN that can never be used, and in the case of automatic PLMN selection the selection of a usable PLMN is not delayed due to the NAS initially selecting a PLMN that can never be used.

In addition to the case of overlapping frequency bands, the UE may read system information from SIB1 of the cell that means that it would not be suitable for some reason such as being barred, forbidden TA, etc. In such a case it is also not desirable for AS to report the PLMN to NAS.

Thus, in the current technique, the UE does not report a PLMN identity to NAS if all the cells from which this PLMN has been read belong to one or more E-UTRA bands that the UE does not support (e.g. in the case in which an unsupported E-UTRA band overlaps with a supported E-UTRA band). The UE may also not report a PLMN to NAS if all the cells from which this PLMN has been read would not be suitable due to being barred, or considered as barred (according to any of the criteria specified in TS 36.304 subclause 5.3.1 or TS 26.331), or belonging to a TA within the "forbidden TAs for roaming", or not fulfilling the cell selection criteria.

Thus the UE suppresses reporting of a PLMN to NAS if the UE decides that all of the cells from which the PLMN identity was read belong to one or more bands that the UE does not support i.e. cells that the UE cannot use. When a UE is unable to determine whether the detected cell operates in a frequency band supported by the mobile device, the PLMN identity of the detected cell may be added to the list of PLMNs. When a UE determines that the detected cell operates in a frequency band supported by the mobile device, the PLMN identity of the detected cell is added to the list of PLMNs.

There has been described a method and corresponding device for searching for and reporting Public Land Mobile Networks "PLMNs" in a mobile telecommunications system, the method comprising, at a mobile device: initiating a scan to find Public Land Mobile Networks; when a cell of a PLMN is detected on a frequency, then reading system information to determine one or more PLMN identities of the detected cell; the device may choose to read some system information to attempt to determine whether the detected cell operates in a frequency band supported by the mobile device; when the device can, based on the system information it has read, determine that the system information indicates that the detected cell operates in a band unsupported by the device, the device omits adding the associated one or more PLMN identities to a list of PLMNs; when the device can, based on the system information it has read, determine that the system information indicates that the detected cell operates in a band supported by the device, the device adds the one or more PLMN identities to the list of PLMNs; and, once the device has considered all cells found in the scan, reporting the list of PLMNs.

In one embodiment, a method and corresponding device for searching for and reporting Public Land Mobile Networks "PLMNs" in a mobile telecommunications system, comprises, at a mobile device: initiating a scan to find Public Land Mobile Networks; when a cell is detected on a frequency, then reading one or more PLMN identities of the detected cell; system information is then examined to determine whether the system information is for a cell supported by the mobile device; when the system information indicates that the detected cell is unsupported by the device, the associated one or more PLMN identities are omitted from being added to a list of PLMNs; when the system information indicates that the detected cell is supported by the device, the one or more PLMN identities of the detected cell are added to the list of PLMNs; and, once the device has considered all cells found in the scan, reporting the list of PLMNs.

In one embodiment, a method and corresponding device for searching for and reporting Public Land Mobile Networks "PLMNs" in a mobile telecommunications system, comprises, at a mobile device: initiating a scan to find Public Land Mobile Networks; when a cell of a PLMN is detected on a frequency, then system information is examined to attempt to determine whether the system information is supported by the mobile device; when it is determined that the system information is unsupported by the device, the one or more PLMN identities of the detected cell is omitted from being added to a list of PLMNs; when it is determined that the system information is supported by the device, the one or more PLMN identities of the detected cell are added to the list of PLMNs; and reporting the list of PLMNs.

According to another embodiment, a method and apparatus for searching for and reporting Public Land Mobile Networks "PLMNs" in a mobile telecommunications system comprises, at a mobile device: initiating a scan to find Public Land Mobile Networks; when a cell of a PLMN is detected on a frequency, then reading system information to determine one or more PLMN identities of the detected cell; determining whether the detected cell operates in a frequency band supported by the mobile device; when it is determined that the detected cell does not operate in a band supported by the device, omitting adding the associated one or more PLMN identities from a list of PLMNs; and otherwise adding the one or more PLMN identities to the list of PLMNs; and reporting the list of PLMNs.

There has also been described an embodiment in which a method and apparatus for searching for and reporting Public Land Mobile Networks "PLMNs" in a mobile telecommunications system, the method comprising, at a mobile device: initiating a scan to find Public Land Mobile Networks; when a cell of a PLMN is detected on a frequency, then reading system information to determine one or more PLMN identities of the detected cell; determining whether the detected cell operates in a frequency band supported by the mobile device; when it is determined that the detected cell does not operate in a band supported by the device, omitting adding the associated one or more PLMN identities from a list of PLMNs; and otherwise adding the one or more PLMN identities to the list of PLMNs; and reporting the list of PLMNs.

Figure 5:
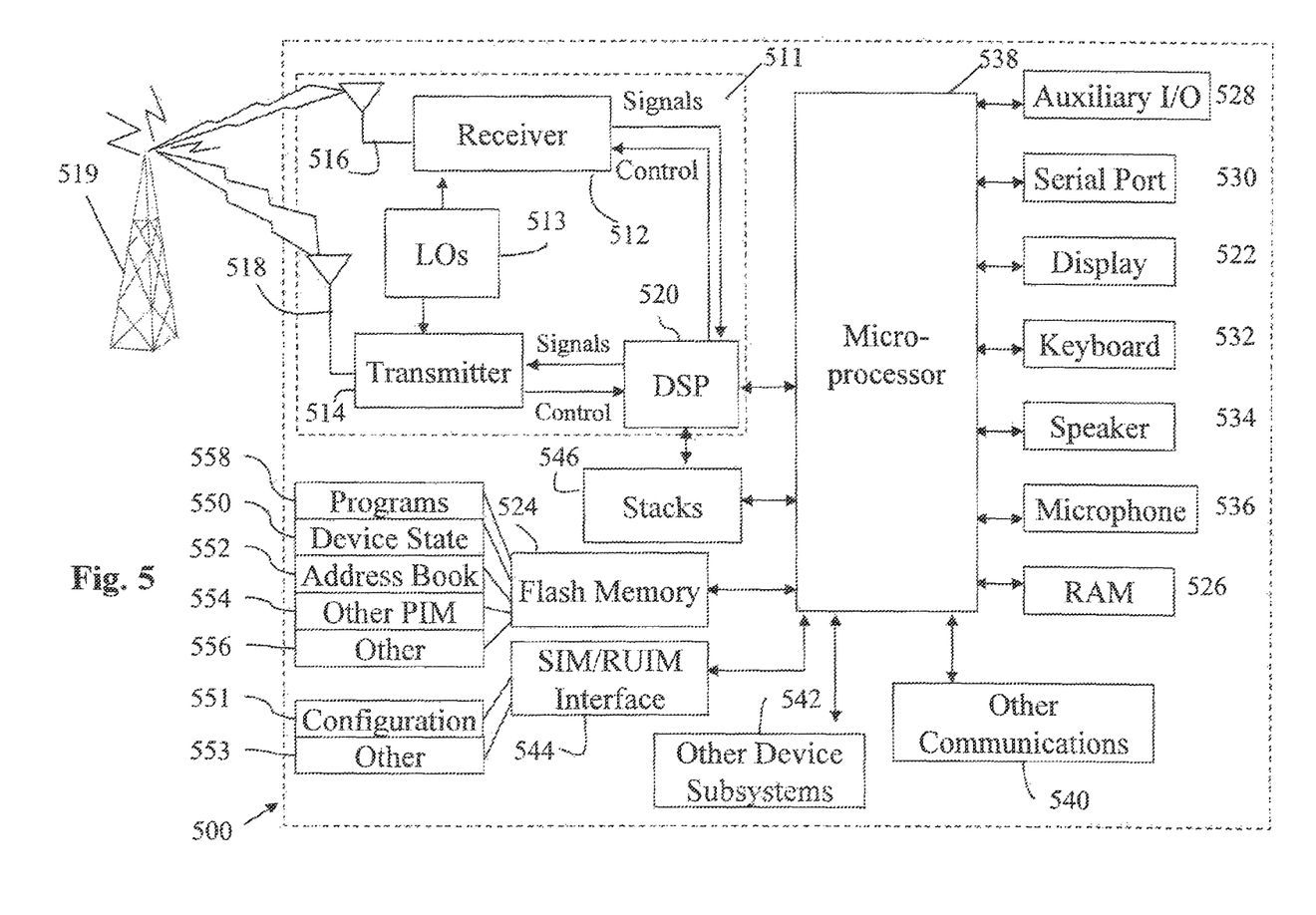
FIG. 5 is a block diagram illustrating a mobile device, which can act as a UE and co-operate with the apparatus and methods of FIGS. 1 to 4.

Turning now to FIG. 5, FIG. 5 is a block diagram illustrating a mobile device, which can act as a UE and co-operate with the apparatus and methods of FIGS. 1 to 2, and which is an exemplary wireless communication device. Mobile station 500 is preferably a two-way wireless communication device having at least voice and data communication capabilities. Mobile station 500 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile station 500 is enabled for two-way communication, it will incorporate a communication subsystem 511, including both a receiver 512 and a transmitter 514, as well as associated components such as one or more, preferably embedded or internal, antenna elements 516 and 518, local oscillators (LOs) 513, and processing means such as a processing module such as a digital signal processor (DSP) 520. As will be apparent to those skilled in the field of communications, the particular design of the communication subsystem 511 will be dependent upon the communication network in which the device is intended to operate. For example, mobile station 500 may include a communication subsystem 511 designed to operate within the Mobitex™ mobile communication system, the DataTAC™ mobile communication system, GPRS network, UMTS network, EDGE network or LTE network.

Network access requirements will also vary depending upon the type of network 502. For example, in the Mobitex and DataTAC networks, mobile station 500 is registered on the network using a unique identification number associated with each mobile station. In UMTS and GPRS networks, however, network access is associated with a subscriber or user of mobile station 500. A GPRS mobile station therefore requires a subscriber identity module (SIM) card in order to operate on a GPRS network. Without a valid SIM card, a GPRS mobile station will not be fully functional. Local or non-network communication functions, as well as legally required functions (if any) such as "911" emergency calling, may be available, but mobile station 500 will be unable to carry out any other functions involving communications over the network 502. The SIM interlace 544 is normally similar to a card-slot into which a SIM card can be inserted and ejected like a diskette or PCMCIA card. The SIM card can have approximately 64K of memory and hold many key configuration 551, and other information 553 such as identification, and subscriber related information.

When required network registration or activation procedures have been completed, mobile station 500 may send and receive communication signals over the network 502. Signals received by antenna 516 through communication network 502 are input to receiver 512, which may perform such common receiver functions as signal amplification, frequency down conversion, filtering, channel selection and the like, and in the example system shown in FIG. 5, analog to digital (A/D) conversion. A/D conversion of a received signal allows more complex communication functions such as demodulation and decoding to be performed in the DSP 520. In a similar manner, signals to be transmitted are processed, including modulation and encoding for example, by DSP 520 and input to transmitter 514 for digital to analog conversion, frequency up conversion, filtering, amplification and transmission over the communication network 502 via antenna 518. DSP 520 not only processes communication signals, but also provides for receiver and transmitter control. For example, the gains applied to communication signals in receiver 512 and transmitter 514 may be adaptively controlled through automatic gain control algorithms implemented in DSP 520.

Mobile station 500 preferably includes processing means such as a microprocessor 538 which controls the overall operation of the device. Communication functions, including at least data and voice communications, are performed through communication subsystem 511. Microprocessor 538 also interacts with further device subsystems such as the display 522, flash memory 524, random access memory (RAM) 526, auxiliary input/output (I/O) subsystems 528, serial port 530, keyboard 532, speaker 534, microphone 536, a short-range communications subsystem 540 and any other device subsystems generally designated as 542.

Some of the subsystems shown in FIG. 5 perform communication-related functions, whereas other subsystems may provide "resident" or on-device functions. Notably, some subsystems, such as keyboard 532 and display 522, for example, may be used for both communication-related functions, such as entering a text message for transmission over a communication network, and device-resident functions such as a calculator or task list, Operating system software used by the microprocessor 538 is preferably stored in a persistent store such as flash memory 524, which may instead be a read-only memory (ROM) or similar storage element (not shown). Those skilled in the art will appreciate that the operating system, specific device applications, or parts thereof, may be temporarily loaded into a volatile memory such as RAM 526. Received communication signals may also be stored in RAM 526.

As shown, flash memory 524 can be segregated into different areas for both computer programs 558 and program data storage 550, 552, 554 and 556. These different storage types indicate that each program can allocate a portion of flash memory 524 for their own data storage requirements. Microprocessor 538, in addition to its operating system functions, preferably enables execution of software applications on the mobile station. A predetermined set of applications that control basic operations, including at least data and voice communication applications for example, will normally be installed on mobile station 500 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 502. In a preferred embodiment, the PIM data items are seamlessly integrated, synchronized and updated, via the wireless network 502, with the mobile station user's corresponding data items stored or associated with a host computer system. Further applications may also be loaded onto the mobile station 500 through the network 502, an auxiliary I/O subsystem 528, serial port 530, short-range communications subsystem 540 or any other suitable subsystem 542, and installed by a user in the RAM 526 or preferably a non-volatile store (not shown) for execution by the microprocessor 538. Such flexibility in application installation increases the functionality of the device and may provide enhanced on-device functions, communication-related functions, or both. For example, secure communication applications may enable electronic commerce functions and other such financial transactions to be performed using the mobile station 500.

In a data communication mode, a received signal such as a text message or web page download will be processed by the communication subsystem 511 and input to the microprocessor 538, which preferably further processes the received signal for output to the display 522, or alternatively to an auxiliary I/O device 528. A user of mobile station 500 may also compose data items such as email messages for example, using the keyboard 532, which is preferably a complete alphanumeric keyboard or telephone-type keypad, in conjunction with the display 522 and possibly an auxiliary I/O device 528. Such composed items may then be transmitted over a communication network through the communication subsystem 511.

For voice communications, overall operation of mobile station 500 is similar, except that received signals would preferably be output to a speaker 534 and signals for transmission would be generated by a microphone 536. Alternative voice or audio I/O subsystems, such as a voice message recording subsystem, may also be implemented on mobile station 500. Although voice or audio signal output is preferably accomplished primarily through the speaker 534, display 522 may also be used to provide an indication of the identity of a calling party, the duration of a voice call, or other voice call related information for example.

Serial port 530 in FIG. 5, would normally be implemented in a personal digital assistant (PDA)-type mobile station for which synchronization with a user's desktop computer (not shown) may be desirable, but is an optional device component. Such a port 530 would enable a user to set preferences through an external device or software application and would extend the capabilities of mobile station 500 by providing for information or software downloads to mobile station 500 other than through a wireless communication network. The alternate download path may for example be used to load an encryption key onto the device through a direct and thus reliable and trusted connection to thereby enable secure device communication.

Other communications subsystems 540, such as a short-range communications subsystem, is a further optional component which may provide for communication between mobile station 500 and different systems or devices, which need not necessarily be similar devices. For example, the subsystem 540 may include an infrared device and associated circuits and components or a Bluetooth™ communication module to provide for communication with similarly enabled systems and devices.

When mobile device 500 is used as a UE, protocol stacks 546 include apparatus and a method for searching for and reporting Public Land Mobile Networks "PLMNs" in a mobile telecommunications system.

In the foregoing specification, the invention has been described with reference to specific embodiments thereof. It will, however, be evident that various modifications and changes may be made thereto without departing from the scope of the technique. The specification and drawings are, accordingly, to be regarded in an illustrative rather than a restrictive sense.

It is to be noted that the methods as described have actions being carried out in a particular order. However, it would be clear to a person skilled in the art that the order of any actions performed, where the context permits, can be varied and thus the ordering as described herein is not intended to be limiting.

It is also to be noted that where a method has been described it is also intended that protection is also sought for a device arranged to carry out the method and where features have been claimed independently of each other these may be used together with other claimed features.

Furthermore it will be noted that the apparatus described herein may comprise a single component such as a UE or UTRAN or other user equipment or access network components, a combination of multiple such components for example in communication with one another or a sub-network or full network of such components.

Embodiments have been described herein in relation to 3GPP specifications. However the method and apparatus described are not intended to be limited to the specifications or the versions thereof referred to herein but may be applicable to future versions or other specifications.

A portion of the disclosure of this patent document contains material which is subject to copyright protection. The copyright owner has no objection to the facsimile reproduction by anyone of the patent document or patent disclosure, as it appears in the Patent and Trademark Office patent file or records, but otherwise reserves all copyright rights whatsoever.

What is claimed is:

1. A method in a mobile telecommunications system, the method comprising, at a mobile device:
    scanning for cells;
    when a cell is detected, obtaining one or more Public Land Mobile Network "PLMN" identities of the detected cell;
    determining if the detected cell operates in a band supported by the device, or if the detected cell operates in a band unsupported by the device; and
    when it is determined that the detected cell operates in the band unsupported by the device, not reporting the one or more PLMN identities to a higher layer of the device; and
    when it is determined that the detected cell operates in the band supported by the device, reporting the one or more PLMN identities to the higher layer of the device.

2. The method according to claim 1, further comprising determining whether the detected cell operates in a frequency band supported by the mobile device.

3. The method according to claim 1, further comprising determining from system information whether the detected cell operates in a frequency band supported by the mobile device.

4. The method according to claim 1, wherein the reporting the one or more PLMN identities comprises adding the one or more PLMN identities to a list, and
    reporting the list of PLMN identities.

5. The method as claimed in claim 1 wherein the one or more PLMN identities are reported to the Non Access Stratum of the mobile device.

6. The method as claimed in claim 1 wherein, when the detected cell is a UMTS cell, determining whether the detected cell operates in a frequency band supported by the mobile device comprises reading system information comprising at least one of a Master Information Block "MIB", a System Information Block 5 "SIB5" and a System Information Block 5bis "SIB5bis".

7. The method as claimed in claim 1 wherein, when the detected cell is a UMTS cell, determining whether the detected cell operates in a frequency band supported by the mobile device comprises reading system information and determining at least one of the following:
    if a Master Information Block MIB indicates that the cell is from the band that the user equipment "UE" does not support;
    whether System Information Block 5bis "SIB5bis" or System Information Block 5 "SIB5" is scheduled in the MIB;
    if a Frequency Band Indicator contained in SIB5 or SIB5bis relates to the unsupported band.

8. The method as claimed in claim 1 wherein, when the detected cell is a LTE cell, determining whether the detected cell operates in a frequency band supported by the mobile device comprises reading system information comprising System Information Block 1 "SIB1".

9. The method as claimed in claim 1 wherein, when the detected cell is a LTE cell, determining whether the detected cell operates in a frequency band supported by the mobile device comprises reading system information comprising System Information Block 1 "SIB1" and determining:
    if freqBandIndicator contained in SIB1 relates to an unsupported band.

10. The method as claimed in claim 1 wherein determining whether the detected cell operates in a frequency band supported by the mobile device comprises reading additional system information scheduled to be transmitted within a threshold time period.

11. The method as claimed in claim 1 wherein determining whether the detected cell operates in a frequency band supported by the mobile device comprises obtaining additional system information, and
    when the additional system information is scheduled to be transmitted later than a threshold time period, reporting the one or more PLMN identities and when additional system information is scheduled to be transmitted within the threshold time period, wait to read the additional system information.

12. The method as claimed in claim 1 further comprising reporting the one or more PLMN identities of the detected cell when unable to determine whether the detected cell operates in a frequency band supported by the mobile device.

13. A wireless telecommunications device comprising:
    a transceiver for transmitting and receiving radio signals;
    a processor; and
    a memory having stored therein: one or more routines executable by the processor, the one or more routines being adapted to search for and report Public Land Mobile Networks "PLMNs" in a mobile telecommunications system, comprising one or more routines adapted to:
    scan for cells;
    when a cell is detected, then obtain one or more PLMN identities of the detected cell;
    determine if the detected cell operates in a band supported by the device, or if the detected cell operates in a band unsupported by the device; and when it is determined that the detected cell operates in the band unsupported by the device, not reporting the one or more PLMN identities to a higher layer of the device, and when it is determined that the detected cell operates in the band supported by the device, reporting the one or more PLMN identities to the higher layer of the device.

14. The wireless telecommunications device according to claim 13, further adapted to determine whether the detected cell operates in a frequency band supported by the device.

15. The wireless telecommunications device according to claim 13, further adapted to determine from system information whether the detected cell operates in a frequency band supported by the device.

16. The wireless telecommunications device according to claim 13, wherein the reporting the one or more PLMN identities comprises adding the one or more PLMN identities to a list, and reporting the list of PLMN identities.

17. The wireless telecommunications device as claimed in claim 13 wherein the device is arranged to report a list of PLMN identities to a Non Access Stratum of the device.

18. The wireless telecommunications device as claimed in claim 13 wherein, when the detected cell is a UMTS cell, the determining whether the detected cell operates in a frequency band supported by the device comprises reading system information from at least one of a Master Information Block "MIB", a System Information Block 5 "SIB5" and a System Information Block 5bis "SIB5bis".

19. The wireless telecommunications device as claimed in claim 13 wherein, when the detected cell is a UMTS cell, determining whether the detected cell operates in a frequency band supported by the device comprises determining at least one of the following:

if a Master Information Block "MIB" indicates that the cell is from the band that the user equipment "UE" does not support;

whether a System Information Block 5bis "SIB5bis" or a System Information Block 5 "SIB5" is scheduled in the MIB;

if a Frequency Band Indicator contained in SIB5 or SIB5bis relates to the unsupported band.

20. The wireless telecommunications device as claimed in claim 13 wherein, when the detected cell is a LTE cell, determining whether the detected cell operates in a frequency band supported by the device comprises reading system information from System Information Block 1 "SIB1".

21. The wireless telecommunications device as claimed in claim 13 wherein, when the detected cell is a LTE cell, determining whether the detected cell operates in a frequency band supported by the device comprises determining:

if freqBandIndicator contained in System Information Block 1 "SIB1" relates to the unsupported band.

22. The wireless telecommunications device as claimed in claim 13 wherein determining whether the detected cell operates in a frequency band supported by the device comprises reading additional system information scheduled to be transmitted within a threshold time period.

23. The wireless telecommunications device as claimed in claim 13 wherein determining whether the detected cell operates in a frequency band supported by the device comprises obtaining additional system information, and when the additional system information is scheduled to be transmitted later than a threshold time period, to report the one or more PLMN identities and when additional system information is scheduled to be transmitted within the threshold time period, to wait to read the additional system information.

24. The wireless telecommunications device as claimed in claim 13 further arranged to report the one or more PLMN identities of the detected cell when unable to determine whether the detected cell operates in a frequency band supported by the device.

25. The non-transitory computer-readable medium having computer-executable instructions adapted to cause a device to perform the method of claim 1.

* * * * *